United States Patent
Mitani et al.

(10) Patent No.: US 7,214,762 B1
(45) Date of Patent: May 8, 2007

(54) REDOX-ACTIVE POLYMER AND ELECTRODE COMPRISING THE SAME

(75) Inventors: Tadaoki Mitani, Ishikawa (JP); Yoshihiro Iwasa, Kanazawa (JP); Hiroshi Uemachi, Ishikawa (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 630 days.

(21) Appl. No.: 10/416,507

(22) PCT Filed: Nov. 21, 2000

(86) PCT No.: PCT/JP00/08224

§ 371 (c)(1),
(2), (4) Date: Sep. 11, 2003

(87) PCT Pub. No.: WO02/42350

PCT Pub. Date: May 30, 2002

(51) Int. Cl.
*C08G 75/02* (2006.01)
*C08G 75/10* (2006.01)

(52) U.S. Cl. ............... 528/390; 528/373; 528/422; 528/44; 528/52; 429/213

(58) Field of Classification Search ......... 528/390, 528/44, 52, 373, 422; 429/213
See application file for complete search history.

(56) References Cited

U.S. PATENT DOCUMENTS

| | | | |
|---|---|---|---|
| 4,833,048 A | 5/1989 | Dejonghe et al. | |
| 5,324,599 A | 6/1994 | Oyama et al. | |
| 5,516,598 A | 5/1996 | Visco et al. | |
| 5,665,492 A | 9/1997 | Sotomura | |

OTHER PUBLICATIONS

H. Uemachi et al.; The Chemical Society of Japan, Chemistry Letters 2000, No. 8, pp. 946-947, Aug. 5, 2000. Cited in the int'l. search report.
Patent Abstracts of Japan, Pub. No. 04-264363, dated Sep. 21, 1992.
Patent Abstracts of Japan, Pub. No. 04-272659, dated Sep. 29, 1992.
Patent Abstracts of Japan, Pub. No. 04-359866, dated Dec. 14, 1992.
Patent Abstracts of Japan, Pub. No. 05-006708, dated Jan. 14, 1993.
Patent Abstracts of Japan, Pub. No. 05-082133, dated Apr. 2, 1993.

(Continued)

*Primary Examiner*—Duc Truong
(74) *Attorney, Agent, or Firm*—Westerman, Hattori, Daniels & Adrian, LLP

(57) ABSTRACT

The present invention provides a new redox-active polymer capable of an adequate redox reaction even at low temperature and effectively usable as a high-capacity, high-energy density battery, a large-area electrochromic element, or a biochemical sensor using a microelectrode. This redox-active polymer is of being prepared by polymerizing an aromatic or heterocyclic compound having two or more thiourea groups with an aromatic or heterocyclic compound having two or more isothiocyanate groups. For example, The redox-active polymer may be of being prepared by polymerizing N,N'-1,4-phenylene-bis-thiourea with phenylene-1,4-diisothiocyanate. The redox-active polymer is suitable as an electrode material, particularly a cathode for lithium secondary batteries.

5 Claims, 1 Drawing Sheet

DISCHARGE

OTHER PUBLICATIONS

Patent Abstracts of Japan, Pub. No. 05-135767, dated Jun. 1, 1993.
Patent Abstracts of Japan, Pub. No. 05-135768, dated Jun. 1, 1993.
Patent Abstracts of Japan, Pub. No. 05-135769, dated Jun. 1, 1993.
Patent Abstracts of Japan, Pub. No. 06-231752, dated Aug. 19, 1994.
Patent Abstracts of Japan, Pub. No. 07-057723, dated Mar. 3, 1995.
Patent Abstracts of Japan, Pub. No. 05-074459, dated Mar. 26, 1993.
Patent Abstracts of Japan, Pub. No. 05-314964, dated Nov. 26, 1993.
Patent Abstracts of Japan, Pub. No. 05-314979, dated Nov. 26, 1993.
Patent Abstracts of Japan, Pub. No. 06-283175, dated Oct. 7, 1994.
Patent Abstracts of Japan, Pub. No. 08-213021, dated Sep. 20, 1996.
Patent Abstracts of Japan, Pub. No. 08-222207, dated Aug. 30, 1996.
Patent Abstracts of Japan, Pub. No. 09-082329, dated Mar. 28, 1997.
Patent Abstracts of Japan, Pub. No. 09-106820, dated Apr. 22, 1997.
Patent Abstracts of Japan, Pub. No. 10-027615, dated Jan. 27, 1998.
Patent Abstracts of Japan, Pub. No. 09-259864, dated Oct. 3, 1997.
Patent Abstracts of Japan, Pub. No. 09-259865, dated Oct. 3, 1997.
Patent Abstracts of Japan, Pub. No. 10-241661, dated Sep. 11, 1998.
Patent Abstracts of Japan, Pub. No. 10-241662, dated Sep. 11, 1998.
Patent Abstracts of Japan, Pub. No. 05-314964, dated Nov. 26, 1993.

REDOX-ACTIVE POLYMER AND ELECTRODE COMPRISING THE SAME

FIELD OF THE INVENTION

The present invention relates to a redox-active polymer capable of a reversible redox reaction and an electrode comprising the polymer used as electrode material.

BACKGROUND ART

In late years, a lithium secondary battery capable of providing a high electromotive force through an oxidation-reduction or redox reaction in lithium has become widely accepted as a new type of high-power, high-energy density battery. This type of lithium secondary battery typically comprises a cathode made of metal oxide, such as cobalt, nickel, manganese, iron, vanadium or niobium oxide.

The cathode made of such a metal oxide, however, involves problems of increase in weight and cost, and a small number of reactive electrons which often leads to an insufficient capacity per weight, resulting in difficulty in obtaining a high-capacity, high-energy density lithium secondary buttery.

In connection with recent studies of using a conductive polymer as electrochemical elements and utilizing such electrochemical elements as an electrode for lightweight, high-energy density batteries, a large-area electrochromic element, or a microelectrode for biochemical sensors, the research has been made on the use of a conductive polymer, such as polyaniline, polypyrrole, polyacene or polythiophene, as a battery electrode.

For example, U.S. Pat. No. 4,833,048 discloses an organosulfur compound for use as a cathode material intended to provide a high-capacity, high-energy density polymer battery. This organosulfur compound serves as an electrode material capable of a reversible reaction such that the S—S bond of an organodisulfide compound is broken through electrolytic reduction to form organic thiolate, and the organic thiolate is electrolytically oxidized to re-create organic disulfide.

The actual research has been made on obtaining a high-energy density lithium secondary buttery by using organosulfur compounds as a cathode material allowing discharge and recharge through a redox reaction in sulfur. However, in use under room temperature, the organosulfur compound exhibits a low redox reaction rate, and a sufficient current cannot be picked up from itself. That is, the organosulfur compound is inherently an insulating material having a low reaction rate at room temperature, and is thereby limited to use at a high temperature of 100° C. or more. In addition, during reduction reaction (discharge period), the organosulfur compound is in a low molecular weight state, and dissolved/diffused out of the electrode, which leads to deterioration in the efficiency of electrode reaction.

In order to solve the above problems, a technique of using a conductive polymer in combination with an organosulfur compound is proposed, as disclosed, for example, in Japanese Patent Laid-Open Publication Nos. H04-264363, H04-272659, H04-359866, H05-6708, H05-82133, H05-135767, H05-135768 and H05-135769, and U.S. Pat. No. 5,324,599.

Japanese Patent Laid-Open Publication No. H06-231752 discloses an electrode prepared by combining 4,5-diamino-2,6-dimercaptopyrimidine, particularly among disulfide compounds, and a conductive polymer with a π-electron conjugated system, and Japanese Patent Laid-Open Publication No. H07-57723 discloses an electrode prepared by combining 7-methyl-2,6,8-trimercaptopurine, particularly among disulfide compounds, and a conductive polymer with a π-electron conjugated system.

Japanese Patent Laid-Open Publication Nos. H05-74459, H05-314979 and H06-283175 disclose an electrode material comprising a conductive polymer with a disulfide group, an electrode material comprising an organosulfur aromatic compound prepared by introducing a sulfur atom into an aromatic carbon atom, and an electrode material comprising an organodisulfide compound polymer consisting of 2,5-dimercapto-1,3,4-thiadiazole (DMcT) or homopolymer of thiocyanuric acid or copolymer thereof, respectively.

In particular, an electrode using a complex of an organosulfur compound and polyaniline or a conductive polymer playing a role of increasing the redox rate of organodisulfide is disclosed in Japanese Patent Laid-Open Publication Nos. H08-213021, H08-222207, H09-82329, H09-106820 and H10-27615. It is also known that a complex of 2,5-dimercapto-1,3,4-thiadiazole (DMcT) and polyaniline can be used as an organosulfur compound-based cathode material for secondary batteries capable of adequately operating even at room temperature ("Contemporary Chemistry" October 1996, pp 34–41).

However, this complex cannot completely suppress the deterioration in capacity because it is not a newly created compound capable of inducing a certain chemical bond. In addition, the separation between polyaniline and DMcT would occur in the electrode to cause deterioration in the mobility of electrons and electrode reaction rate.

There have also been known some techniques for improving the cycle characteristics of an organodisulfide electrode, such as the use of metal complex of organodisulfide (U.S. Pat. Nos. 5,516,598 and 5,665,492, and Japanese Patent Laid-Open Publication Nos. H09-259864, H09-259865, H10-241661 and H10-241662), and the use of an positive material comprising a mixture of a conductive polymer and a lithium thiolate compound with S—Li ionic bond which will form S—S bond through electrolytic oxidation (Japanese Patent Laid-Open Publication No. 05-314964).

DISCLOSURE OF INVENTION

It is an object of the present invention to provide a new redox-active polymer capable of an adequate redox reaction even at low temperature and effectively usable as a high-capacity, high-energy density battery, a large-area electrochromic element, or a biochemical sensor using a microelectrode.

It is another object of the present invention to provide a new redox-active polymer for use in a battery electrode, capable of adequately inducing charge/discharge reactions even at room temperature to provide a large charge/discharge current so as to obtain a high-capacity high-energy density battery.

The present inventors have successfully solved the above objects by developing a new polymer reactant having a principal chain incorporated with 1,3-dithioketo and diamine.

Specifically, according to a first aspect of the present invention, there is provided a redox-active polymer prepared by polymerizing an aromatic or heterocyclic compound having two or more thiourea groups with an aromatic or heterocyclic compound having two or more isothiocyanate groups.

According to a second aspect of the present invention, there is provided a redox-active polymer having a reduced form represented by the following formula (1) and an oxidized form represented by the following formula (2):

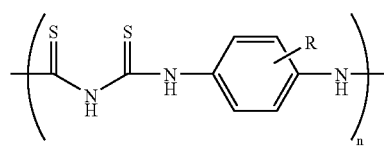

Formula (1)

wherein n is an integer number of 2 or more, and any substituent R selected from the group consisting of a lower alkyl group, amino group, halogen group, hydroxyl group and sulphone group may be bonded to the benzene ring;

Formula (2)

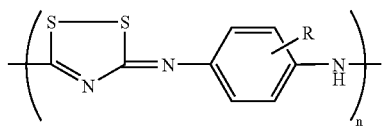

wherein n is an integer number of 2 or more, and any substituent R selected from the group consisting of a lower alkyl group, amino group, halogen group, hydroxyl group and sulphone group may be bonded to the benzene ring.

According to a third aspect of the present invention, there is provided a redox-active polymer prepared by polymerizing N,N'-1,4-phenylene-bis-thiourea with phenylene-1,4-diisothiocyanate. This redox-active polymer is represented by the following formula (3):

Formula (3)

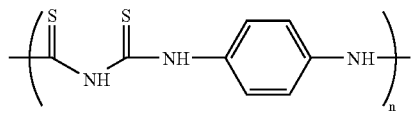

wherein n is an integer number of 2 or more, and a substituent R may be bonded to the benzene ring.

According to a fourth aspect of the present invention, there is provided a redox-active polymer prepared by polymerizing an aromatic or heterocyclic compound having two or more S-alkylated thiourea groups with an aromatic or heterocyclic compound having two or more isothiocyanate groups. This redox-active polymer is represented by the following formula (4):

Formula (4)

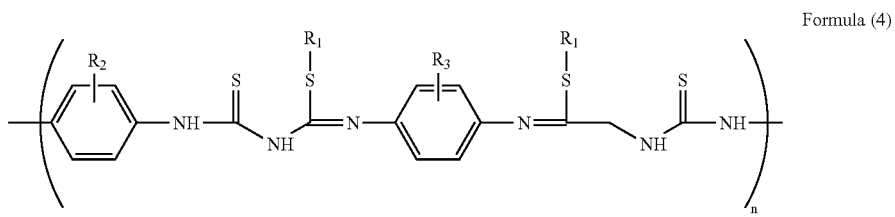

wherein n is an integer number of 2 or more, R1 is an alkyl group introduced as a protective group, and one or both of substituents R2 and R3 may be bonded to the benzene ring, wherein R2 or R3 is a substituent selected from the group consisting of a lower alkyl group, amino group, halogen group, hydroxyl group and sulphone group.

According to a fifth aspect of the present invention, there is provided a redox-active polymer prepared by polymerizing N,N'-1,4-phenylene-bis-thiourea-S,S'-benzyl ether with phenylene-1,4-diisothiocyanate. This redox-active polymer is the most preferable embodiment of the present invention, and represented by the following formula (5):

Formula (5)

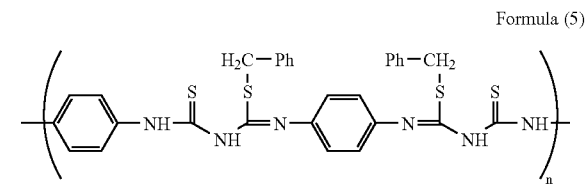

According to a sixth aspect of the present invention, there is provided an electrode comprising the redox-active polymer as set forth in either one of the first to fifth aspects of the present invention. The electrode may be a cathode for a lithium secondary battery.

In the formulas (1) to (4), the substituent R, R2 or R3 to be bonded to the benzene ring includes a lower alkyl group, amino group, halogen group, hydroxyl group and sulphone group. The R1 in the formula is an alkyl group introduced as a protective group. This alkyl group includes methyl, ethyl, phenylbenzyl and tert-butyl.

The aromatic or heterocyclic compound having two or more thiourea groups includes: N,N'-1,4-phenylene-bis-thiourea; N,N'-1,4-naphthalene-bis-thiourea; N,N'-2,5-pyrrole-bis-thiourea; N,N'-2,5-thiophene-bis-thiourea; and N,N',N"-1,2,4-phenylene-tri-thiourea. Particularly, N,N'-1,4-phenylene-bis-thiourea is preferable.

The aromatic or heterocyclic compound having two or more S-alkylated thiourea groups includes: N,N'-1,4-phenylene-bis-thiourea-S,S'-benzyl ether; N,N'-1,4-naphtalene-bis-thiourea-S,S'-ethyl ether; N,N'-2,5-pyrrole-bis-thiourea-S,S'-methyl ether; N,N'-2,5-thiophene-bis-thiourea-S,S'-tert-butyl ether; and N,N',N"-1,2,4-phenylene-tri-thiourea-S,S'-benzyl ether. Particularly, N,N'-1,4-phenylene-bis-thiourea-S,S'-benzyl ether is preferable.

The aromatic or heterocyclic compound having two or more isothiocyanate groups includes: phenylene-1,4-diisothiocyanate; naphthalene-1,4-diisothiocyanate; thiophene-2,5-diisothiocyanate; pyrrole-2,5-diisothiocyanate; and phenylene-1,2,4-triisothiocyanate. Particularly, phenylene-1,4-diisothiocyanate is preferable.

In the redox-active polymer of the present invention, 1,3-dithioketo and diamine are incorporated in its π-conjugated polymer backbone so as to obtain a large capacity which has not been realized by conventional electrode materials, and to achieve fundamental improvements to capacity deterioration and low reaction rate.

It is believed that a redox reaction mechanism in the redox-active polymer of the present invention comprises two reactions; one reaction of S—S<->SH, and the other reaction caused at diamine, as shown in the following formula. The redox function will be described below. The polymer represented by the formula (1) will be converted into a reduced form having two S atoms each bonded with H. The polymer represented by the formula (2) will be converted into an oxidized form having S—S bonds. Generally, S may be bonded with metal M (Li or Na) as a substitute for H.

Given that the substituent R is H in the formula (1), if this unit (Mw=194) have a two-electron reaction in the form of an S—S bond, the theoretical capacity of the polymer will be 276 mAh/g. If one-electron reaction is further caused in the S—S ring, the theoretical capacity will be 414 mAh/g. Otherwise, even if one-electron reaction per unit is further caused at the region of diamine, the theoretical capacity will be 414 mAh/g. These values are the same level as or greater than that of the high-capacity organosulfur compound.

subsequently redox reactions will be repeated in the form of the formulas (1) and (2) according to the above reaction formula.

The redox-active polymer of the present invention can also fundamentally improve the problems of capacity deterioration and low reaction rate in the conventional organosulfur compounds. More specifically, even if the S—S bond is split during reduction, different from the manner of the conventional organosulfur compounds in which the principal polymer chain is decomposed to reduce the molecular weight, the sulfur atoms will remain as side chains in the form of thiol or thioketo to prevent capacity deterioration caused by the dissolution/diffusion of the polymer to electrolyte solution. The redox-active polymer of the present invention is also free from capacity deterioration due to the disruption of crystal structure as in inorganic compounds.

In the redox-active polymer of the present invention, the sulfur atoms in one molecule are located adjacent to one another to facilitate their intramolecular reaction during oxidation and reduction. In addition, the sulfur and nitrogen atoms bonded to the π-conjugated backbone can provide an increased charge-transfer rate. It has been reported that a heterocyclic ring including a disulfide group exhibits quasi-aromaticity during oxidation. Thus, the ring of the redox-active polymer having a plenty of π-electrons would provide an increased electron transfer rate. Further, the redox-active polymer will be a π-conjugated polymer in its oxidized state to have conductivity.

The new redox-active polymer of the present invention can be prepared through a polyaddition reaction of thiourea+isothiocyanate, caused by refluxing starting materials with nonpolar, intermediate polar or polar solvents. In order to increase efficiency of the reaction, the polymer is practically prepared by introducing an alkyl group into a thioketo group of the thiourea to form S-ether.

The alkyl group R1 introduced as S-ether can be removed through oxidization or reduction. Thus, the alkyl group R1 may be eliminated through a subsequent electrochemical treatment. Alternatively, it may be left as-is and then eliminated through battery reaction.

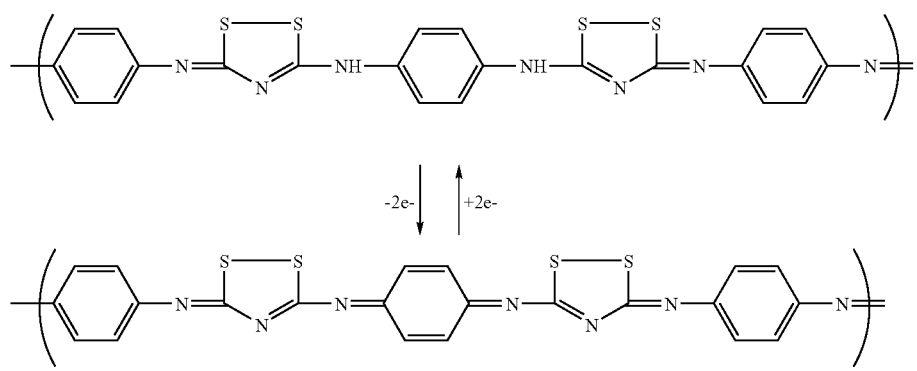

The polymer represented by the formula (4) has the protective group R2 for facilitating the synthesizing process thereof. The polymer may be used as an electrode material while leaving the protective group R2 therein because it can be readily removed through either chemical or electrochemical process. Specifically, the protective group R2 may be released or eliminated in an initial battery reaction, and In producing an electrode using the redox-active polymer of the present invention, a conductive material, an ion conductive material and/or a binder is added to the redox-active polymer according to need. The conductive material may include metal powder, carbon material, and conductive macromolecule. For example, the metal powder may include nickel power, and stainless steel powder. The carbon material may include acetylene black, vapor deposited carbon, and graphite. The conductive macromolecule may include polyaniline, polypyrrole, polyparaphenylene, polyacetylene and derivatives thereof.

The ion conductive material may include an inorganic-ion solid electrolyte, and an organic-ion solid electrolyte. The organic-ion solid electrolyte may includes: a polymer comprising either one of polyethylene oxide (PEO), polyacrylonitrile (PAN) or derivative thereof, and electrolytic salt contained therein; and a gel polymer comprising either one of PEO, PAN or derivative thereof, and electrolytic solution impregnated therein.

The binder may include a polymer, such as polyvinylidene fluoride (PVDF), commonly used in production for electrodes.

Further, in producing an electrode using the redox-active polymer of the present invention, as the need arises, another organosulfur compound or sulfur, such as 2,5-dimercapto-1,3,4-thiadiazole (DMcT), may be added to the redox-active polymer to provide an increased specific surface area of the electrode, or a fibrous or particulate solid material such as zeolite or whisker to provide enhanced film formation.

The electrode comprising the redox-active polymer of the present invention can be produced through a conventional method, for example, by adding a conductive material or the like to the redox-active polymer, mixing them with mortar, and applying the obtained mixture onto a collector or the like, or by packing the redox-active polymer with a pressing machine.

The electrode material of the present invention can be suitably used as a cathode material for lithium secondary butteries. When the electrode produced from the above redox-active polymer or reversible electrode material is used as a cathode of a lithium battery, the cathode may be used with a conventional or commonly used anode and/or electrolyte. For example, the anode may be of: lithium metal; lithium alloy; carbon or inorganic material capable of absorbing and releasing lithium; or composition comprising carbon, and aluminum or aluminum-contained alloy as primary components.

The electrolyte may be a liquid comprising: an organic solvent, such as ethylene carbonate, and a lithium compound serving as electrolytic salt, such as $LiClO_4$, dissolved in the solvent; a solid electrolyte comprising inorganic material or polymer; a gel polymer electrolyte prepared in a gel form by impregnating a polymer with the above liquid.

In addition to the application to battery electrodes, the redox-active polymer of the present invention may be applied to electrochromic elements having a high coloring/de-coloring rate, sensors such as a glucose sensor having a high response rate, or an electrochemical analogue memory having a high write/read rate.

DESCRIPTION OF THE PREFERRED EMBODIMENT

Example

Figure 1:
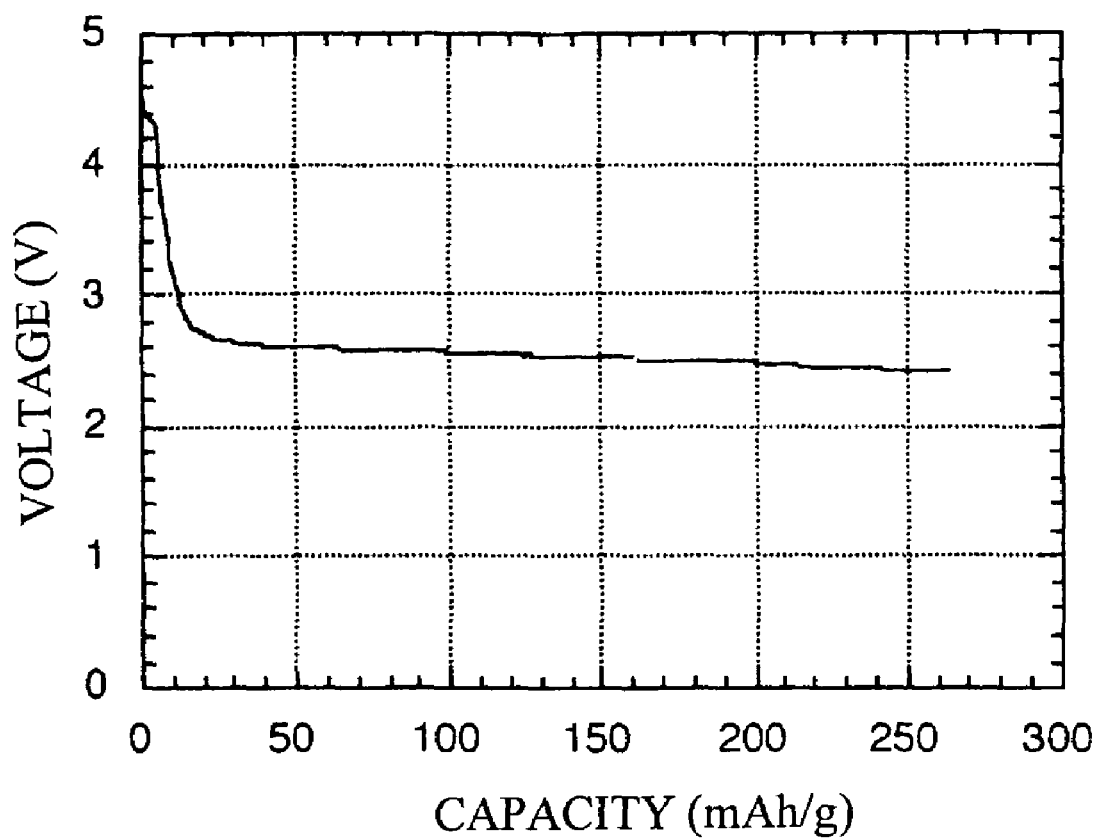
FIG. 1 is a graph showing a discharge characteristic in the third discharge cycle of a lithium secondary battery having a cathode comprising a redox-active polymer of the present invention.

A method of synthesizing a 1,2,4-dithiazolium-diaminobenzene polymer according to one embodiment of the present invention will be now described in connection with a specific example where the polymer is used as an electrode material for batteries. It is to be understood that the intended purpose of a redox-active polymer of the present invention is not limited to the electrode material for batteries as shown in the following example, but the present invention may be used in any other suitable purposes for utilizing the characteristics of the redox-active polymer.

Example 1

(1) Synthesis of N,N'-1,4-phenylene-bis-thiourea-S,S'-benzyl ether represented by the following reaction formula:

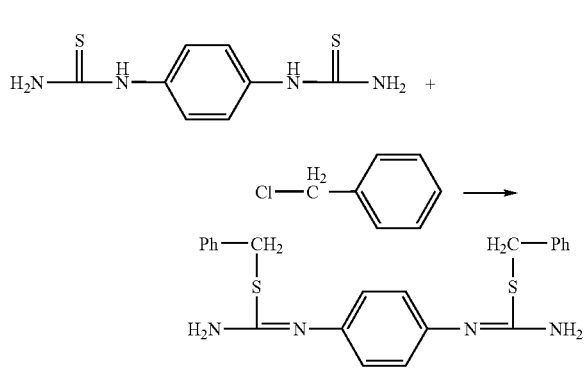

230 mg of N,N'-1,4-phenylene-bis-thiourea was dissolved in a mixed solution of 4 ml of NMP and 4 ml of EtOH, and then 270 mg of benzyl chloride was dropped in the obtained solution. This solution was refluxed for 30 minutes. The reacted solution was cooled down to room temperature, and then added with an alkaline solution comprising 10 ml of distilled water and 80 mg of NaOH dissolved therein. 40 ml of ether was further added thereto, and the formed ether layer was extracted. The extracted ether solution was added with 150 mg of anhydrous magnesium sulfate, and stirred for 2 hours. Then, the ether solution was filtered, and the obtained filtrate was evaporated. In this way, 400 mg of N,N'-1,4-phenylene-bis-thiourea-S,S'-benzyl ether was obtained.

(2) Synthesis of S-benzylized poly (phenyl-2,4-dithiobiuret) as represented by the following reaction formula:

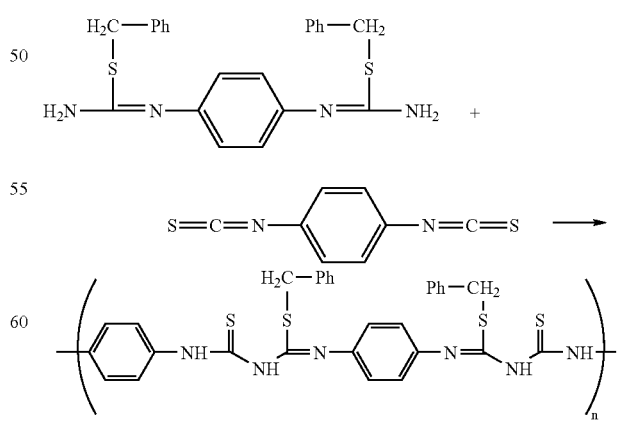

406 mg of N,N'-1,4-phenylene-bis-thiourea-S,S'-benzyl ether was dissolved in a mixed solution of 10 ml of dry THF and 10 ml of benzene. This solution was added with a mixture prepared by dissolving 200 mg of phenylene-1,4-diisothiocyanate in a mixed solution of 5 ml of dry THF and 5 ml of benzene. The obtained solution was fluxed for 3 days, and the reacted solution was filtered. The solid matter on the filter paper was rinsed with acetone to obtain 100 mg of S-benzylized poly (phenyl-2,4-dithiobiuret).

(3) Synthesis of 1,2,4-dithiazolium-diaminobenzene Polymer

An intended 1,2,4-dithiazolium-diaminobenzene polymer can be obtained by reacting S-benzylized poly (phenyl-2,4-dithiobiuret) with oxidant or electrochemically causing an oxidative reaction in S-benzylized poly (phenyl-2,4-dithiobiuret). Differently, in this example, S-benzylized poly (1-phenyl-2,4-dithiobiuret) was used to produce an battery electrode, and after the assembly of an battery, a 1,2,4-dithiazolium-diaminobenzene polymer was synthesized through a battery reaction.

0.4 g of S-benzylized poly (1-phenyl-2,4-dithiobiuret) powder was adequately ground on a mortar. This power was added with 0.4 g of acetylene black in several steps, and they were ground and mixed together. The mixed power was further added with 0.1 g of PVDF, and they were mixed up. Then, the obtained mixture was added and mixed with 50 ml of DMF to obtain a mixed solution. This solution was printed on a titanium foil having an area of 10×10 cm and a thickness of 30 cm, and then subjected to vacuum heat treatment at 80° C. for 3 hours. The obtained foil was cut out in a piece of 1×1 cm to provide a sample electrode.

A tripolar beaker-type model battery was fabricated by using the sample electrode as a cathode, and using a metal lithium electrode as an anode and a reference electrode. An electrolyte solution for the model battery was prepared by dissolving $LiClO_4$ in propylene carbonate and adjusting the solution at 1M. The model battery was entirely fabricated within a glove box with nitrogen gas flow. A battery reaction was produced under conditions of a lower limit of discharge voltage of 1.75 V, an upper limit of charge voltage of 4.5 V, and a charge reaction at a constant current of 0.1 mA. A 1,2,4-dithiazolium-diaminobenzene polymer was formed on the cathode while producing the battery reaction.

(4) Measurement Result of Battery Characteristics

A discharge characteristic in the third discharge cycle was measured. The result is shown in FIG. 1. After the third cycle, each discharge cycle exhibited the same curve as FIG. 1, and a large capacity per active material mass of 260 mAh/g which has not been achieved by the conventional electrode materials. It was also verified that the charge/discharge reactions can be repeated. The respective discharge capacities in discharge curves for the first and second discharge cycles were less than those for the third and subsequent cycles.

INDUSTRIAL APPLICABILITY

As mentioned above in detail, the redox-active polymer of the present invention includes a principal chain incorporated with 1,3-dithioketo and diamine to provide excellent char acteristics as a new polymer having a redox ability. The redox-active polymer can facilitate smooth electron transfer. The redox-active polymer is usable in various electrochemical elements for batteries, electrochromic display elements, sensors, memories or the like. In particular, the redox-active polymer used as a cathode material for lithium secondary batteries provides an increased charge/discharge current and achieves a high-capacity, high-energy density battery.

What is claimed is:

1. A redox-active polymer having a principal chain incorporated with 1,3-dithioketo and diamine, prepared by polymerizing an aromatic or heterocyclic compound having two or more thiourea groups with an aromatic or heterocyclic compound having two or more isothiocyanate groups.

2. A redox-active polymer having a reduced form represented by the following general formula (1) and an oxidized form represented by the following general formula (2):

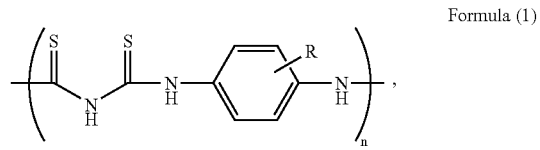

Formula (1)

wherein n is an integer number of 2 or more, and any substituent R selected from the group consisting of a lower alkyl group, amino group, halogen group, hydroxyl group and sulphone group may be bonded to the benzene ring;

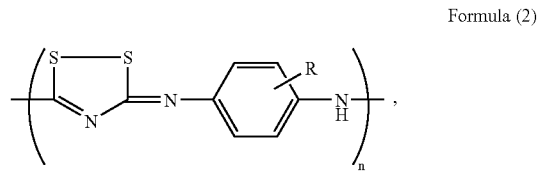

Formula (2)

wherein n is an integer number of 2 or more, and any substituent R selected from the group consisting of a lower alkyl group, amino group, halogen group, hydroxyl group and sulphone group may be bonded to the benzene ring.

3. A redox-active polymer prepared by polymerizing N,N'-1,4-phenylene-bis-thiourea with phenylene-1,4-diisothiocyanate, said redox-active polymer being represented by the following formula (3):

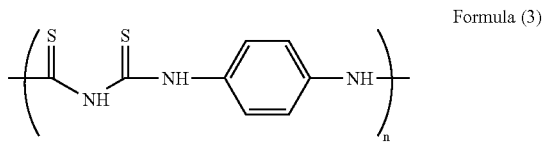

Formula (3)

4. The redox-active polymer as defined in claim 1, which is represented by the following formula (4):

Formula (4)

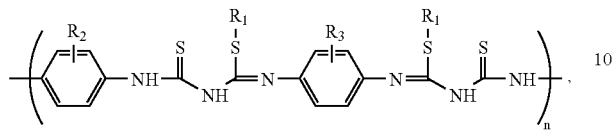

wherein n is an integer number of 2 or more, R1 is an alkyl group introduced as a protective group, and one or both of substituents R2 and R3 may be bonded to the benzene ring, wherein R2 or R3 is a substituent selected from the group consisting of a lower alkyl group, amino group, halogen group, hydroxyl group and sulphone group.

5. A redox-active polymer is prepared by polymerizing N,N'-1,4-phenylene-bis-thiourea-S,S'-benzyl ether with phenylene-1,4-diisothiocyanate, said redox-active polymer being represented by the following formula (5):

Formula (5)

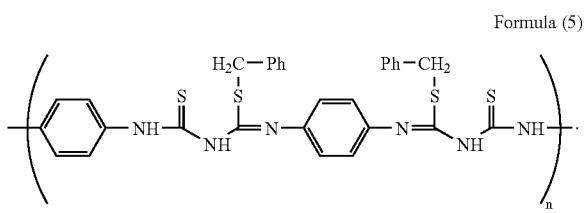

* * * * *